(12) United States Patent
Tokushima et al.

(10) Patent No.: US 11,383,389 B2
(45) Date of Patent: Jul. 12, 2022

(54) ROBOT, ROBOT SYSTEM, AND ROBOT CONTROL APPARATUS

(71) Applicant: Seiko Epson Corporation, Tokyo (JP)

(72) Inventors: Daiki Tokushima, Azumino (JP); Akitoshi Maeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 170 days.

(21) Appl. No.: 16/775,494

(22) Filed: Jan. 29, 2020

(65) Prior Publication Data
US 2020/0238535 A1    Jul. 30, 2020

(30) Foreign Application Priority Data
Jan. 30, 2019  (JP) .............................. JP2019-014048

(51) Int. Cl.
| B25J 13/00 | (2006.01) |
| G06F 1/12 | (2006.01) |
| G06F 13/42 | (2006.01) |
| H04L 7/04 | (2006.01) |

(52) U.S. Cl.
CPC ................ *B25J 13/00* (2013.01); *G06F 1/12* (2013.01); *G06F 13/4282* (2013.01); *H04L 7/04* (2013.01)

(58) Field of Classification Search
CPC ........ B25J 13/00; G06F 13/4282; G06F 1/12; H04L 7/04
See application file for complete search history.

(56) References Cited

U.S. PATENT DOCUMENTS

| 4,868,474 A * | 9/1989 | Lancraft ............ G05B 19/4141 318/568.2 |
| 5,557,634 A * | 9/1996 | Balasubramanian ........ H04L 27/0008 375/222 |
| 6,091,219 A * | 7/2000 | Maruo .................. G05B 19/31 318/562 |
| 2005/0188136 A1 | 8/2005 | Ishikawa |
| 2005/0228541 A1 * | 10/2005 | Sehnert .................... H04B 3/54 700/245 |
| 2017/0193817 A1 | 7/2017 | Ogawa |

FOREIGN PATENT DOCUMENTS

| JP | H08-195785 A | 7/1996 |
| JP | 2005-236649 A | 9/2005 |
| WO | WO-2016/042636 A1 | 3/2016 |

* cited by examiner

*Primary Examiner* — Rahel Guarino
(74) *Attorney, Agent, or Firm* — Gang Yu (57) ABSTRACT

A robot includes a robot control apparatus that communicates with a device, wherein a transmission terminal of a clock synchronization serial communication system of the device and a reception terminal of the robot control apparatus are connected by a signal line, and the robot control apparatus receives an asynchronous signal from the device.

8 Claims, 8 Drawing Sheets

ROBOT, ROBOT SYSTEM, AND ROBOT CONTROL APPARATUS

The present application is based on, and claims priority from JP Application Serial Number 2019-014048, filed Jan. 30, 2019, the disclosure of which is hereby incorporated by reference herein in its entirety.

BACKGROUND

1. Technical Field

The present disclosure relates to a robot, robot system, and robot control apparatus.

2. Related Art

A micom of a control unit provided in a robot control apparatus communicates with peripheral devices with constant periods. The control unit transmits data request signals to the peripheral devices and the peripheral devices transmit data to the control unit according to the requests.

Note that "micom" refers to a microcomputer.

Here, the number of wires connecting between the micom of the control unit and the micoms of the peripheral devices is larger. To reduce the number of wires, the micom of the control unit and the micoms of the peripheral device are connected by a single wire, and the wire is commoditized. Further, UART (Universal Asynchronous Receiver/Transmitter) communication is used.

When the number of wires is larger, for example, the volume of the wires is larger and the connectors are upsized, and thereby, the wires may occupy the larger space. Further, the number of items of the micoms is larger and the structure may be complex.

As an example of the related art, an encoder system in which a CPU (Central Processing Unit) of a single controller and CPUs of many encoders are series-connected is disclosed (see International Publication NO. 2016/042636). In the encoder system, the wires may be reduced compared to the star connection as one-to-one connection.

However, as disclosed in International Publication NO. 2016/042636, when the micom of the control unit and the micoms of many peripheral devices are connected by the single wire, the communication volume in the single wire is larger compared to the case of connection by a plurality of wires. Accordingly, the time taken for single transmission or reception may be longer and responsiveness may be deteriorated.

To address that, connection by a clock synchronization serial communication system at a faster communication speed is conceivable, however, in the clock synchronization serial communication system, there is a problem that reduction of the number of wires is hard due to the presence of clock wires.

SUMMARY

An aspect is directed to a robot including a robot control apparatus that communicates with a device, wherein a transmission terminal of a clock synchronization serial communication system of the device and a reception terminal of the robot control apparatus are connected by a signal line, and the robot control apparatus receives an asynchronous signal from the device.

Another aspect is directed to a robot including a robot control apparatus that communicates with a device, wherein a transmission terminal of a clock synchronization serial communication system of the robot control apparatus and a reception terminal of the device are connected by a signal line, and the robot control apparatus transmits an asynchronous signal to the device.

Another aspect is directed to a robot system including a robot, and a robot control apparatus that communicates with a device and controls the robot, wherein a transmission terminal of a clock synchronization serial communication system of the device and a reception terminal of the robot control apparatus are connected by a signal line, and the robot control apparatus receives an asynchronous signal from the device.

Another aspect is directed to a robot control apparatus that communicates with a device, including a reception terminal connected to a transmission terminal of a clock synchronization serial communication system of the device by a signal line, and receiving an asynchronous signal from the device.

DESCRIPTION OF EXEMPLARY EMBODIMENTS

As below, embodiments will be explained with reference to the drawings.

Robot

Figure 1:
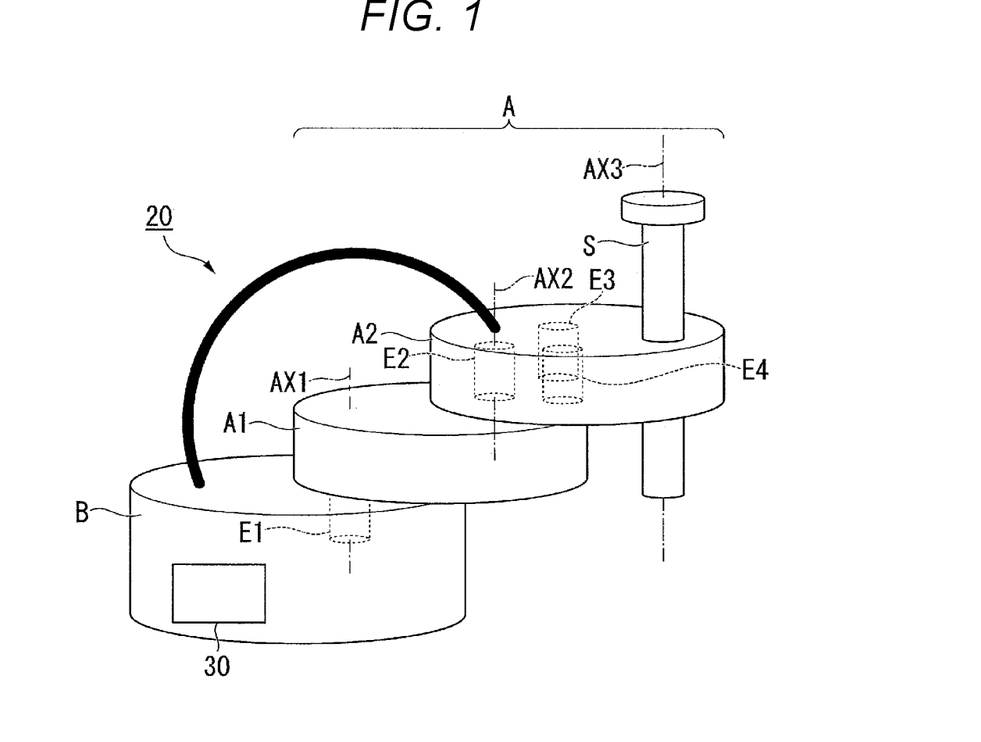
FIG. 1 shows a schematic configuration of a robot according to an embodiment.

FIG. 1 shows the schematic configuration of the robot 20 according to the embodiment.

The robot 20 is a scalar robot. The scalar robot is also called a horizontal articulated robot. Note that the robot 20 may be another type of robot such as a vertical articulated robot or linear motion robot in place of the scalar robot. Here, the vertical articulated robot may be a single-arm robot having a single arm or a multi-arm robot having two or more arms. The multi-arm robot having two arms is also called a dual-arm robot. Or, the robot 20 may be a robot having any number of axes e.g. six axes.

The robot 20 includes a base B and a movable unit A.

The robot 20 includes a robot control apparatus 30 inside of the base B.

The base B supports the movable unit A. In the example shown in FIG. 1, the base B is placed on a predetermined placement surface. The placement surface is e.g. a floor surface of a room in which the robot 20 is allowed to perform work. Note that the placement surface may be another surface such as a wall surface of the room, a ceiling surface of the room, a top surface of a table, a surface of a jig, or a surface of a bench in place of the floor surface.

Hereinafter, for convenience of explanation, of directions orthogonal to the placement surface, the direction from the base B toward the placement surface is referred to as "lower" or "downward direction". Further, hereinafter, for convenience of explanation, the direction opposite to the downward direction is referred to as "upper" or "upward direction".

In the embodiment, horizontal directions are directions orthogonal to the upward and downward directions.

Further, "pivot" means rotary motion around an axis, and includes cases where rotation angles are smaller than 360 degrees and cases where rotation angles are equal to or larger than 360 degrees. Further, "pivot" includes not only rotary motion in one direction, but rotary motion in both directions.

The movable unit A includes a first arm A1 pivotably supported about a first pivot axis AX1 by the base B, a second arm A2 pivotably supported about a second pivot axis AX2 by the first arm A1, and a shaft S pivotably supported about a third pivot axis AX3 and translationally supported in an axial direction of the third pivot axis AX3 by the second arm A2.

The shaft S is an axial member having a circular cylinder shape. A ball spring groove (not shown) and a spline groove (not shown) are respectively provided in the circumferential surface of the shaft S. In the example shown in FIG. 1, the shaft S is provided to penetrate an end portion at the opposite side to the first arm A1 of the end portions of the second arm A2 in the upward and downward directions.

An external device can be attached to the end of the shaft S. The external device attachable to the end of the shaft S is an end effector or the like. The end of the shaft S refers to the lower end portion of upper and lower two end portions of the shaft S.

In the example shown in FIG. 1, nothing is attached to the end of the shaft S. The end effector attached to the end of the shaft S is e.g. an end effector that can hold an object using finger portions. Note that the end effector attached to the end of the shaft S may be an end effector capable of holding an object by suction using air, suction using magnetic force, or the like. Or, the end effector attached to the end of the shaft S may be an end effector incapable of holding an object. Here, in the embodiment, holding an object means enabling a condition to lift an object.

The first arm A1 pivots about the first pivot axis AX1 and moves in the horizontal directions.

Further, the first arm A1 is pivoted about the first pivot axis AX1 by a first drive unit of the base B. The first drive unit is an actuator that pivots the first arm A1 about the first pivot axis AX1. The first drive unit is e.g. a motor. That is, in the embodiment, the first pivot axis AX1 is a virtual axis that coincides with the pivot axis of the first drive unit. Note that the first drive unit may be another actuator that pivots the first arm A1 in place of the motor.

The robot 20 includes an encoder E1 that detects an amount of driving of the first drive unit in the base B. The amount of driving is e.g. an amount of rotation of the pivot axis. The encoder E1 is e.g. a battery-less encoder and detects without power supply.

The second arm A2 pivots about the second pivot axis AX2 and moves in the horizontal directions.

Further, the second arm A2 is pivoted about the second pivot axis AX2 by a second drive unit of the second arm A2. The second drive unit is an actuator that pivots the second arm A2 about the second pivot axis AX2. The second drive unit is e.g. a motor. That is, in the embodiment, the second pivot axis AX2 is a virtual axis that coincides with the pivot axis of the second drive unit. Note that the second drive unit may be another actuator that pivots the second arm A2 in place of the motor.

The robot 20 includes an encoder E2 that detects an amount of driving of the second drive unit in the second arm A2. The amount of driving is e.g. an amount of rotation of the pivot axis. The encoder E2 is e.g. a battery-less encoder and detects without power supply.

Further, the second arm A2 includes a third drive unit and a fourth drive unit and supports the shaft S.

The third drive unit is an actuator that pivots a ball screw nut provided in the outer circumferential portion of the ball screw groove of the shaft S via a timing belt or the like. Thereby, the third drive unit moves the shaft S in the upward and downward directions. The third drive unit is e.g. a motor. Note that the third drive unit may be another actuator that moves the shaft S in the upward and downward directions in place of the motor.

The robot 20 includes an encoder E3 that detects an amount of driving of the third drive unit in the second arm A2. The amount of driving is e.g. an amount of rotation of the pivot axis. The encoder E3 is e.g. a battery-less encoder and detects without power supply.

The fourth drive unit is an actuator that pivots a ball spline nut provided in the outer circumferential portion of the spline groove of the shaft S via a timing belt or the like. Thereby, the fourth drive unit pivots the shaft S about the third pivot axis AX3. The fourth drive unit is e.g. a motor. That is, in the embodiment, the third pivot axis AX3 is a virtual axis that coincides with the pivot axis of the fourth drive unit. Note that the fourth drive unit may be another actuator that pivots the shaft S about the third pivot axis AX3 in place of the motor.

The robot 20 includes an encoder E4 that detects an amount of driving of the fourth drive unit in the second arm A2. The amount of driving is e.g. an amount of rotation of the pivot axis. The encoder E4 is e.g. a battery-less encoder and detects without power supply.

Here, in the embodiment, the configuration in which the robot control apparatus 30 is integrated with the robot 20 is shown, however, as another configuration example, a configuration of a robot system in which the robot 20 and the robot control apparatus 30 are separately formed may be used. In the robot system, the robot 20 and the robot control apparatus 30 are connected in wired connection or wireless connection.

Robot Control Apparatus

Figure 2:
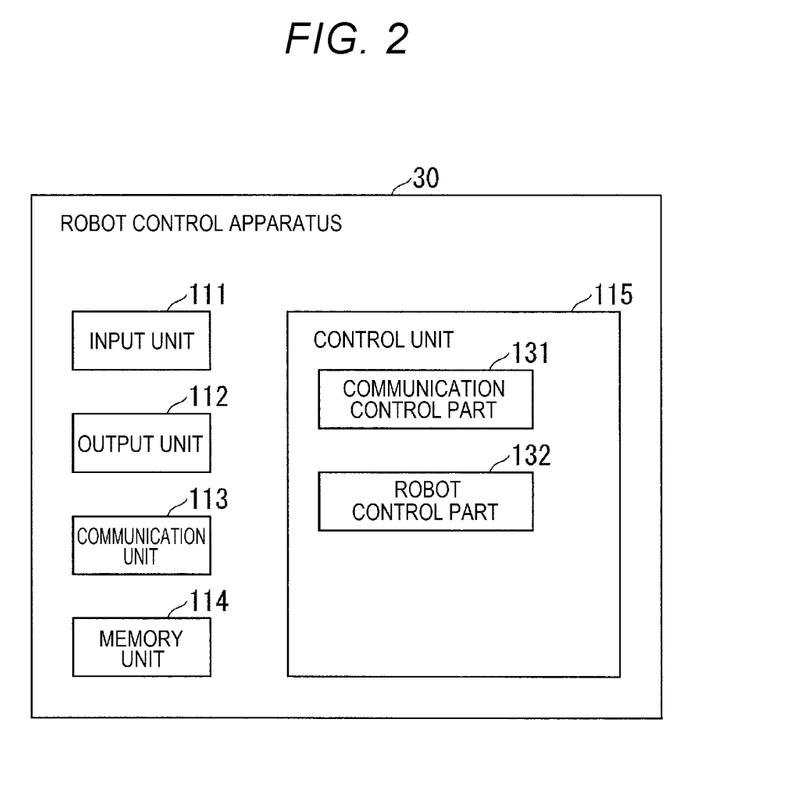
FIG. 2 shows a functional configuration of a robot control apparatus according to the embodiment.

FIG. 2 shows the functional configuration of the robot control apparatus 30 according to the embodiment.

The robot control apparatus 30 includes an input unit 111, an output unit 112, a communication unit 113, a memory unit 114, and a control unit 115.

The control unit 115 includes a communication control part 131 and a robot control part 132.

The input unit 111 externally inputs information. As an example, the input unit 111 inputs information output from an external device. As another example, the input unit 111 has an operation part that receives details of an operation performed by a user and inputs information according to the details of the operation performed on the operation part.

The output unit 112 externally outputs information. As an example, the output unit 112 outputs information to an external device. As another example, the output unit 112 outputs information by displaying the information on a screen or outputs information as sound.

The communication unit 113 has a function of communication.

The memory unit 114 stores information.

The control unit 115 performs various kinds of control.

The communication control part 131 controls communication performed by the communication unit 113. In the embodiment, the communication includes communication from the robot control apparatus 30 to the encoders E1 to E4 and communication from the encoders E1 to E4 to the robot control apparatus 30.

The robot control part 132 controls actions of the robot 20.

Note that the control unit 115 may perform not only the control of the communication and the control of the robot 20, but other various kinds of control.

Here, in the embodiment, in the robot control apparatus 30, the control unit 115 and the memory unit 114 are formed using micoms.

Communication Between Robot Control Apparatus and Encoders

In the embodiment, the communication between the robot control apparatus 30 and the encoders E1 to E4 is explained.

In the embodiment, the directions from the robot control apparatus 30 to the encoders E1 to E4 are referred to as "downstream" and the directions from the encoders E1 to E4 to the robot control apparatus 30 are referred to as "upstream".

The robot control apparatus 30 and the respective encoders E1 to E4 have micoms.

The micom of the robot control apparatus 30 and the micoms of the encoders E1 to E4 are connected by a bus line. As the bus line connecting the single micom and the plurality of micoms, e.g. a common line or a line of daisy-chain connection.

Communication is performed between the micom of the robot control apparatus 30 and the micoms of the respective encoders E1 to E4.

Usually, the micom of the robot control apparatus 30 has higher clock, i.e., higher processing speed than the micoms of the encoders E1 to E4.

Here, in the embodiment, for convenience of explanation, single lines are shown as the respective signal lines, however, a configuration for communication of differential signals with dual signal lines may be used. The dual lines may be more suitable for larger distance communication than the signal lines.

Note that, when the micom of the robot control apparatus 30 and the micoms of the encoders E1 to E4 are mounted on the same substrate, single-ended communication may be used without any problem in principle.

Clock Synchronization Serial Communication System and Asynchronous Serial Communication System A clock synchronization serial communication system and an asynchronous serial communication system are explained.

The clock synchronization serial communication system is a communication system using a clock line represented by SPI (Serial Peripheral Interface).

The asynchronous serial communication system is a communication system without using a clock line represented by an asynchronous system. UART refers to an asynchronous conversion circuit. The asynchronous serial communication has an advantage that the number of lines is smaller and the cost is lower compared to the clock synchronization serial communication.

The asynchronous serial communication includes a clock-embedded system. The clock-embedded system is a communication system using only a data signal formed by superimposition and embedding of a clock signal represented by Manchester coding, 8b/10b thereon. In the clock-embedded system, the number of lines is smaller, but the conversion circuit tends to be larger and the cost tends to be higher.

Note that the clock-embedded system may be also referred to as "embedded clock system".

SPI and UART are explained.

Generally, in communication between micoms, a clock signal is used for keeping pace of processing.

The SPI communication is often employed in micom-to-micom communication.

In the SPI communication, the micom at the transmission side transmits the data signal by a single signal line and transmits the clock signal of itself by a single signal line separately from the data signal, that is, transmits these two types of signals by two signal lines. Then, data is transmitted and received in synchronization with the clock of the micom at the transmission side. As described above, the SPI communication is in the clock synchronization system. Further, faster communication can be performed in the SPI communication.

In the SPI communication, the micom at the transmission side may start transmission and reception at the time appropriate for itself. Accordingly, the clock speed of the micom at the reception side may be lower than that of the micom at the transmission side. Thereby, a simple clock circuit may be sufficient and both micoms can be formed using inexpensive CPUs.

In the UART communication, the period of transmission and reception is set to a particular period between the micoms. The micom at the transmission side transmits only the data signal by the single signal line, but does not transmit the clock signal. The micom at the reception side transmits and receives data using the clock signal of itself.

In the UART communication, the micom at the reception side is not capable of determining when the transmission and reception start, and thus, it is necessary to set the clock speed to about ten times the real clock speed for increasing the sampling resolution.

Accordingly, in the UART communication, when the transmission and reception are performed at the nearly equal speed as the SPI communication, a circuit having a higher clock speed is necessary, expensive CPUs are necessary for both micoms, and the entire system is expensive. On the other hand, in the UART communication, when the speed nearly equal to that of the SPI communication is not required, it is necessary to lower the speed of transmission and reception even when the micom at the nearly equal level as the micom used for the SPI communication is used.

Note that, in the UART communication, if long data is transmitted, the data may be shifted. Thus, the data is divided into small pieces of 8 bits or the like for transmission, and the data transmission speed is generally lower.

For example, the speed at which communication in the asynchronous system can be performed is up to 3.75 Mbps.

It is impossible for the micom to operate only the transmission without reception faster in the asynchronous system.

UART-SPI Communication

Figure 3:
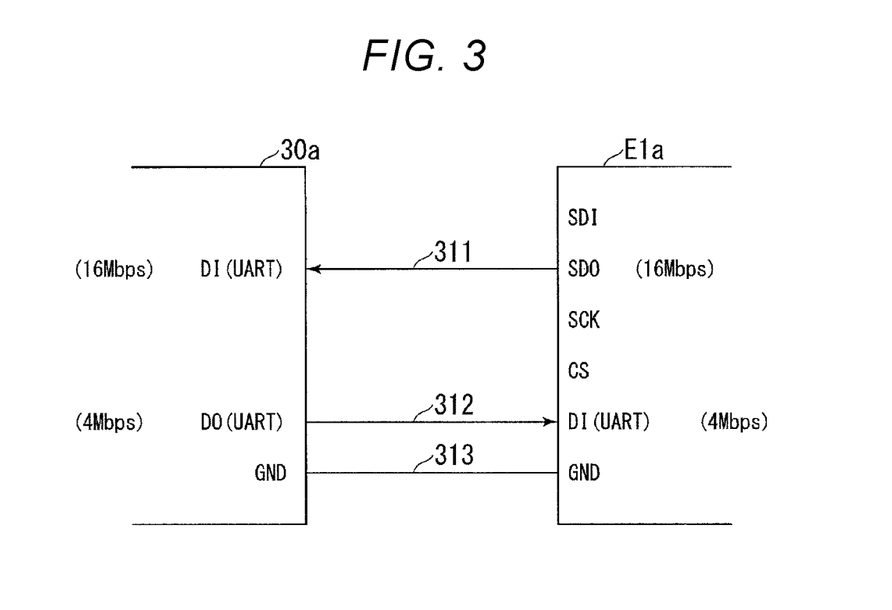
FIG. 3 shows a schematic configuration of UART-SPI communication according to the embodiment.

FIG. 3 shows the schematic configuration of UART-SPI communication according to the embodiment.

FIG. 3 shows an example of connection between a micom 30a of the robot control apparatus 30 and a micom E1a of the encoder E1.

Here, one encoder E1 of the four encoders E1 to E4 is explained, and the same applies to the other encoders E2 to E4.

The micom 30a has a DI terminal as a data input terminal, a DO terminal as a data output terminal, and a GND terminal as a ground terminal as terminals for UART.

The micom E1a has an SDI terminal as a data input terminal, an SDO terminal as a data output terminal, an SCK terminal as a clock terminal, a CS terminal as a chip select terminal, and a GND terminal as a ground terminal as terminals for SPI. Further, the micom E1a has a DI terminal as a data input terminal as a terminal for UART.

The GND terminal of the micom 30a and the GND terminal of the micom E1a are connected by a signal line 313. Thereby, the grounds are held at the same potential in the micom 30a and the micom E1a.

The DI terminal for UART of the micom 30a and the SDO terminal for SPI of the micom E1a are connected by a signal line 311. The data signal transmitted from the SDO terminal is transmitted via the signal line 311 and received by the DI terminal. In the embodiment, the communication speed of 16 Mbps is set for the SDO terminal and the DI terminal in advance. Thereby, the communication of the data signal from the encoder E1 to the robot control apparatus 30 is performed at 16 Mbps without using the clock signal.

The DO terminal for UART of the micom 30a and the DI terminal for UART of the micom E1a are connected by a signal line 312. The data signal transmitted from the DO terminal is transmitted via the signal line 312 and received by the DI terminal. In the embodiment, the communication speed of 4 Mbps is set for the DO terminal and the DI terminal in advance. Thereby, the communication of the data signal from the robot control apparatus 30 to the encoder E1 is performed at 4 Mbps without using the clock signal.

In the example of FIG. 3, the SDO terminal and the asynchronous communication are used, and thereby, the communication without the clock line is realized. In the example of FIG. 3, the SDO terminal for SPI of the micom E1a is an example of a transmission terminal and the DI terminal for UART of the micom 30a is an example of a reception terminal.

Note that an expensive element such as FPGA (Field Programmable Gate Array) is often provided in the robot control apparatus 30, and there is no difficulty in switching between speeds.

As described above, in the micoms E1a to E4a having both a function of SPI communication and a function of UART communication, high-speed transmission from the micom E1b to the micom 30b is realized using the SPI function.

In the example of FIG. 3, of the SDO terminal, the SDI terminal, the SCK terminal, the CS terminal, and the GND terminal in the five line system of SPI, the SDO terminal and the GND terminal are used, but the SDI terminal, the SCK terminal, and the CS terminal are not used.

The transmission of data signals from the encoder E1 to E4 to the robot control apparatus 30 at 16 Mbps is arranged and set for both, and the data signals may be received at appropriate times.

When the data signals are transmitted from the robot control apparatus 30 to the encoder E1 to E4, the normal UART function is used. In the example of FIG. 3, the UART communication at the low speed of 4 Mbps is performed.

Configuration of Full-Duplex Communication

Figure 4:
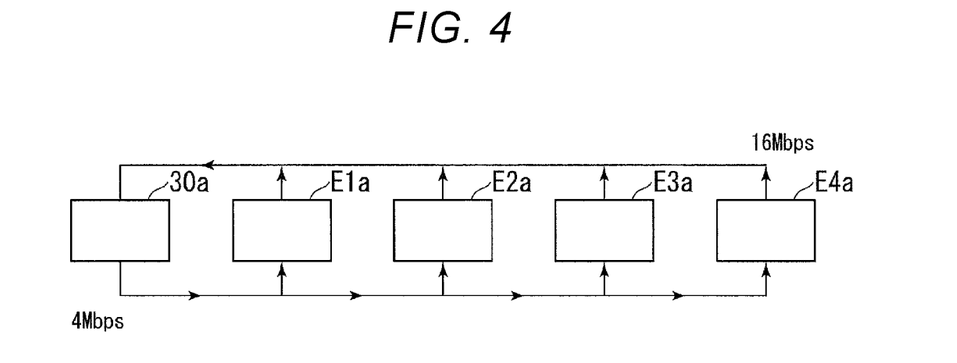
FIG. 4 shows a schematic configuration of full-duplex communication according to the embodiment.

FIG. 4 shows the schematic configuration of full-duplex communication according to the embodiment.

FIG. 4 shows an example of the configuration of full-duplex communication when the communication shown in FIG. 3 is performed.

FIG. 4 shows the micom 30a of the robot control apparatus 30 and the micoms E1a to E4a of the respective encoders E1 to E4. The signal line 311 and the signal line 312 shown in FIG. 3 are commonalized with respect to each of the four micoms E1a to E4a.

Note that, in the example of FIG. 4, the illustration of the signal line 313 of the GND terminal is omitted. The signal line 313 is commonalized with respect to the four micoms E1a to E4a.

Specifically, regarding the communication of the data signals from the micom 30a of the robot control apparatus 30 to the micoms E1a to E4a of the encoders E1 to E4, the respective micoms E1a to E4a are connected to the common downstream signal line connected to the micom 30a in a parallel position relationship. For example, broadcast signals can be transmitted from the micom 30a to all of the micoms E1a to E4a.

Similarly, regarding the communication of the data signals from the micoms E1a to E4a of the encoders E1 to E4 to the micom 30a of the robot control apparatus 30, the respective micoms E1a to E4a are connected to the common upstream signal line connected to the micom 30a in a parallel position relationship. For example, response signals can be transmitted from the respective micoms E1a to E4a to the micom 30a at different times.

In the full-duplex communication, the communication of the data signals from the robot control apparatus 30 to the encoders E1 to E4 and the communication of the data signals from the encoders E1 to E4 to the robot control apparatus 30 can be simultaneously performed.

In this example, the communication of the data signals from the robot control apparatus 30 to the encoders E1 to E4 is normal UART communication and the communication of the data signals from the encoders E1 to E4 to the robot control apparatus 30 is UART communication using the SDO terminal for SPI.

For example, a scheme of returning high-speed communication responses by the respective encoders E1 to E4 to a broadcast low-speed communication command from the robot control apparatus 30 may be realized.

Asynchronous Signal Waveform

Figure 5:
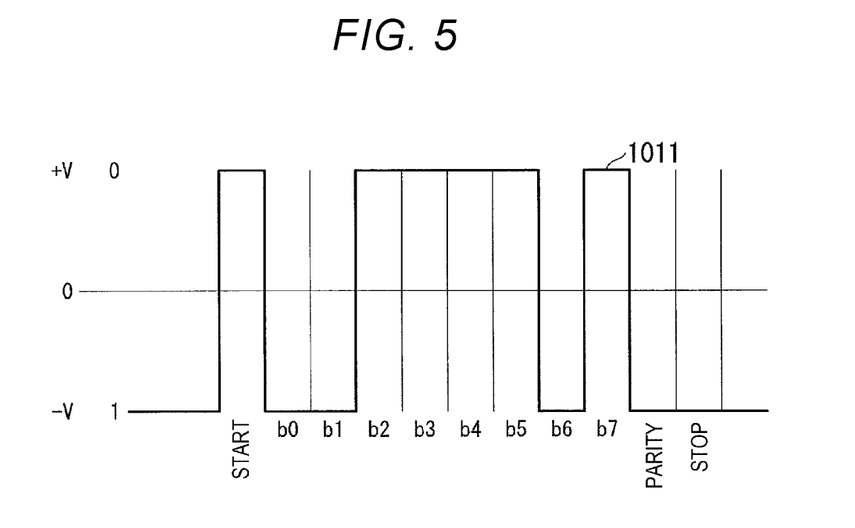
FIG. 5 shows an example of a signal waveform according to the embodiment.

FIG. 5 shows the example of the signal waveform according to the embodiment.

FIG. 5 shows an example of a signal wave 1011 of a data signal transmitted from the SDO terminal of the micom E1a of the encoder E1 to the DI terminal of the micom 30a of the robot control apparatus 30. The waveform of the signal wave 1011 is an asynchronous waveform, an example of RS232C.

In the example of FIG. 5, the horizontal axis indicates time and the vertical axis indicates voltage.

As voltages, with V as a positive value, +V, −V, and 0 are shown. In this example, the state at the voltage +V corresponds to 0 bit and the state at the voltage −V corresponds to 1 bit. +V and −V are symmetrical values with respect to zero.

The signal wave 1011 for one period includes 1 bit of start bit, 8 bits of data bits b0 to b7, 1 bit of parity bit, and 1 bit of stop bit sequentially arranged.

Here, the start bit represents the start position of the signal wave 1011.

The stop bit represents the end position of the signal wave 1011.

The data bits b0 to b7 represent contents of data to be communicated.

The parity bit is a bit for error detection and, in this example, set to be even with the data bits b0 to b7 so that an even number of "1" exist. In the example of FIG. 5, three data bits as "1" exist of the 8 bits of data bits b0 to b7, and the parity bit is "1".

One-to-One Connection of SPI-SPI Communication

Figure 6:
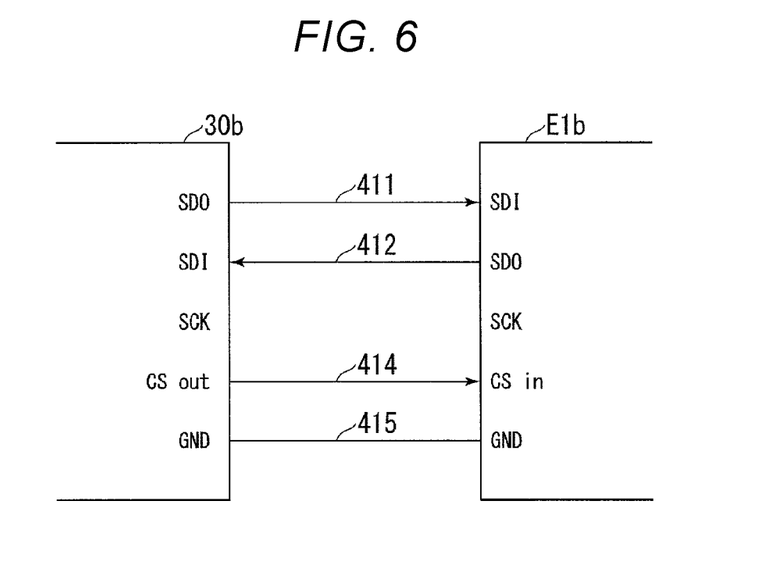
FIG. 6 shows a configuration of one-to-one connection of SPI-SPI communication according to the embodiment.

FIG. 6 shows the configuration of one-to-one connection of SPI-SPI communication according to the embodiment.

FIG. 6 shows an example different from the example in FIG. 3.

FIG. 6 shows an example of connection between the micom 30*b* of the robot control apparatus 30 and the micom E1*b* of the encoder E1.

Here, one encoder E1 of the four encoders E1 to E4 is explained, and the same applies to the other encoders E2 to E4.

Each of the micom 30*b* and the micom E1*b* has an SDI terminal as a data input terminal, an SDO terminal as a data output terminal, an SCK terminal as a clock terminal, a CS terminal as a chip select terminal, and a GND terminal as a ground terminal as terminals for SPI.

Here, in this example, the other end of communication is selected by chip select from the robot control apparatus 30 to the encoder E1. For the purpose, the micom 30*b* has a CSout terminal as an output terminal as the CS terminal and the micom E1*b* has a CSin terminal as an input terminal as the CS terminal.

The GND terminal of the micom 30*b* and the GND terminal of the micom E1*b* are connected by a signal line 415. Thereby, the grounds are held at the same potential in the micom 30*b* and the micom E1*b*.

The CSout terminal of the micom 30*b* and the CSin terminal of the micom E1*b* are connected by a signal line 414. A chip select signal transmitted from the CSout terminal is transmitted via the signal line 414 and received by the CSin terminal. Thereby, communication of the chip select signal from the robot control apparatus 30 to the encoder E1 is performed.

Here, the chip select signal is a signal for selection of the other end of communication. For example, when there are the plurality of encoders E1 to E4, one of the encoders is selected as the other end of communication. Each of the plurality of encoders E1 to E4 performs communication when the chip select signal for selection of the encoder itself is input, but waits without communication in the other cases.

In the embodiment, the plurality of encoders E1 to E4 are connected to the single robot control apparatus 30. For the purpose, the CSout terminals in the same number as that of the encoders E1 to E4 are provided in the micom 30*b* of the robot control apparatus 30. The respective CSout terminals are connected to the respective encoders E1 to E4 via the respective signal lines.

The SDO terminal of the micom 30*b* and the SDI terminal of the micom E1*b* are connected by a signal line 411. The data signal transmitted from the SDO terminal is transmitted via the signal line 411 and received by the SDI terminal. Thereby, the communication of the data signal from the robot control apparatus 30 to the encoder E1 is performed.

The SDI terminal of the micom 30*b* and the SDO terminal of the micom E1*b* are connected by a signal line 412. The data signal transmitted from the SDO terminal is transmitted via the signal line 412 and received by the SDI terminal. Thereby, the communication of the data signal from the encoder E1 to the robot control apparatus 30 is performed.

In the example of FIG. 6, in the communication from the micom E1*b* of the encoder E1 to the micom 30*b* of the robot control apparatus 30, and the communication from the micom 30*b* of the robot control apparatus 30 to the micom E1*b* of the encoder E1, the SDO terminal and the asynchronous communication are used, and thereby, the communication without the clock line is realized.

In the example of FIG. 6, the SDO terminal for SPI of the micom E1*b* is an example of the transmission terminal and the SDI terminal for SPI of the micom 30*b* is an example of the reception terminal. Further, in the example of FIG. 6, the SDO terminal for SPI of the micom 30*b* is an example of the transmission terminal and the SDI terminal for SPI of the micom E1*b* is an example of the reception terminal.

Note that the number of signal lines may be made smaller in the configuration of UART-SPI communication shown in FIG. 3 than in the configuration of SPI-SPI communication shown in FIG. 6.

One-to-Many Connection of SPI-SPI Communication

Figure 7:
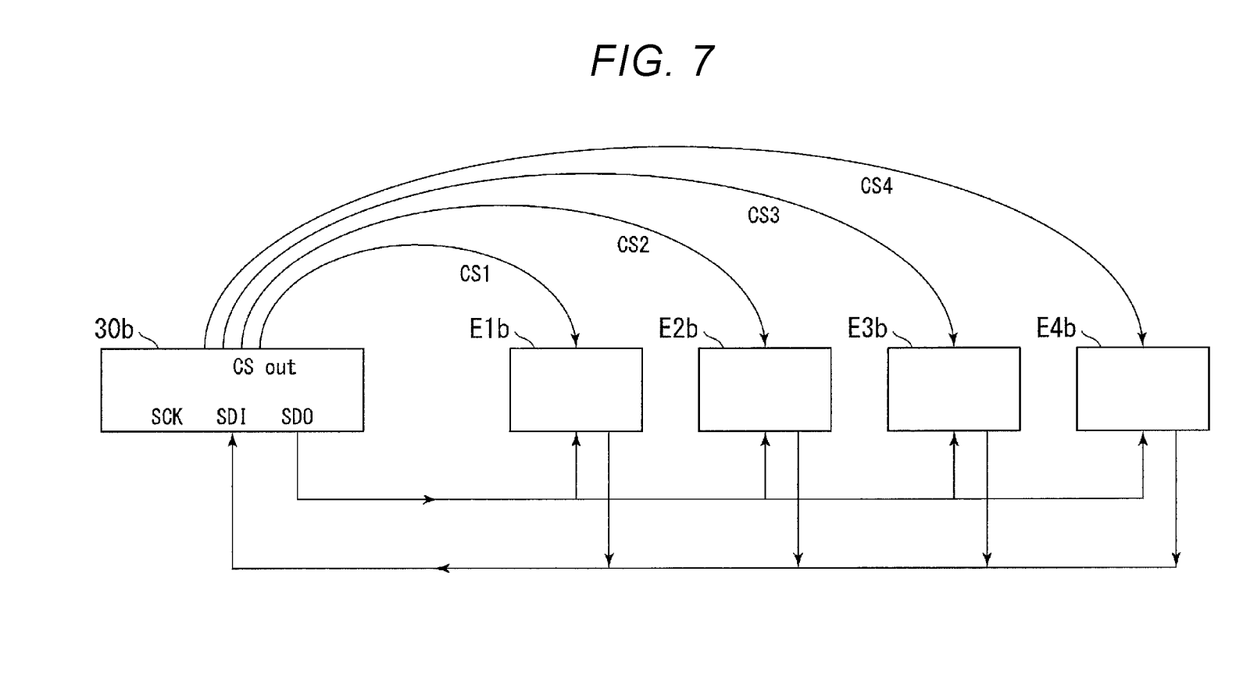
FIG. 7 shows a configuration of one-to-many connection of SPI-SPI communication according to the embodiment.

FIG. 7 shows the configuration of one-to-many connection of SPI-SPI communication according to the embodiment.

FIG. 7 shows an example of a configuration of full-duplex communication when the communication shown in FIG. 6 is performed.

FIG. 7 shows the micom 30*b* of the robot control apparatus 30 and the micoms E1*b* to E4*b* of the respective encoders E1 to E4. The signal lines 411 and 412 shown in FIG. 6 are commonalized with respect to each of the four micoms E1*b* to E4*b*.

Note that, in the example of FIG. 7, illustration of the signal line 415 of the GND terminal is omitted. The signal line 415 is commonalized with respect to the four micoms E1*b* to E4*b*.

Specifically, regarding the communication of data signals from the micom 30*b* of the robot control apparatus 30 to the micoms E1*b* to E4*b* of the encoders E1 to E4, the respective micoms E1*b* to E4*b* are connected to the common downstream signal line connected to the micom 30*b* in a parallel position relationship. For example, broadcast signals can be transmitted from the micom 30*b* to all of the micoms E1*b* to E4*b*.

Similarly, regarding the communication of the data signals from the micoms E1*b* to E4*b* of the encoders E1 to E4 to the micom 30*b* of the robot control apparatus 30, the respective micoms E1*b* to E4*b* are connected to the common upstream signal line connected to the micom 30*b* in a parallel position relationship. For example, response signals can be transmitted from the respective micoms E1*b* to E4*b* to the micom 30*b* at different times.

Further, regarding the communication of the chip select signals from the micom 30*b* of the robot control apparatus 30 to the micoms E1*b* to E4*b* of the encoders E1 to E4, the respective micoms E1*b* to E4*b* of the encoders E1 to E4 are connected to the micom 30*b* using different signal lines. For example, the chip select signals can be transmitted from the micom 30*b* to the respective micoms E1*b* to E4*b* at different times. Thereby, the respective micoms E1*b* to E4*b* are selected at different times and transmit response signals to the micom 30b at different times.

In the full-duplex communication, the communication of the data signals from the robot control apparatus 30 to the encoders E1 to E4 and the communication of the data signals from the encoders E1 to E4 to the robot control apparatus 30 can be simultaneously performed.

In this example, the communication of the data signals from the robot control apparatus 30 to the encoders E1 to E4 and the communication of the data signals from the encoders E1 to E4 to the robot control apparatus 30 are respectively communication using the SDO terminals for SPI.

For example, a scheme of returning high-speed communication responses by the respective encoders E1 to E4 to a broadcast low-speed communication command from the robot control apparatus 30 may be realized.

Principles of Full-Duplex Communication and Half-Duplex Communication

Here, the principles of full-duplex communication and half-duplex communication are explained.

Figure 8:
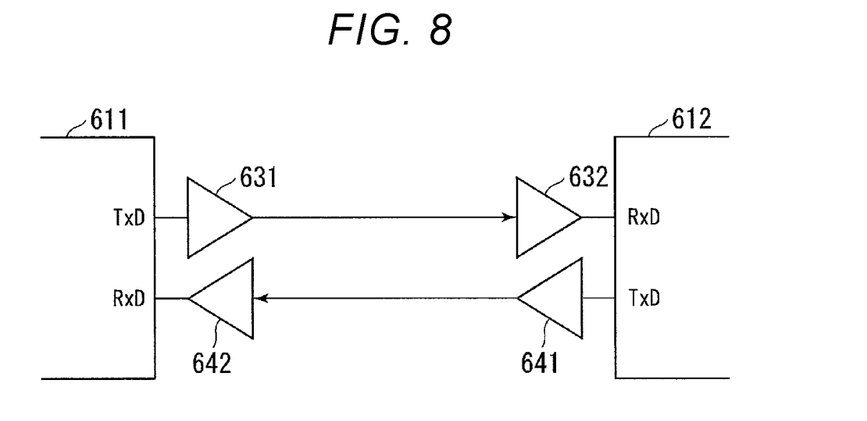
FIG. 8 shows a principle of full-duplex communication according to the embodiment.

FIG. 8 shows the principle of full-duplex communication according to the embodiment.

FIG. 8 shows a configuration example of full-duplex communication between a computer 611 and a computer 612.

The computer 611 has a TxD terminal as a terminal for transmitting a data signal and an RxD terminal as a terminal for receiving a data signal.

Similarly, the computer 612 has a TxD terminal as a terminal for transmitting a data signal and an RxD terminal as a terminal for receiving a data signal.

The TxD terminal of the computer 611 and the RxD terminal of the computer 612 are connected using a signal line. Note that, in the example of FIG. 8, amplifiers 631, 632 that amplify the data signal transmitted in the signal line are shown.

Similarly, the TxD terminal of the computer 612 and the RxD terminal of the computer 611 are connected using a signal line. Note that, in the example of FIG. 8, amplifiers 641, 642 that amplify the data signal transmitted in the signal line is shown.

In the configuration of full-duplex communication, simultaneously with the communication of the data signal from one computer 611 to the other computer 612, the communication of the data signal from the other computer 612 to one computer 611 can be performed.

As described above, in the full-duplex communication, two sets of the communication paths in one direction are used, and thereby, bidirectional communication is realized.

Figure 9:
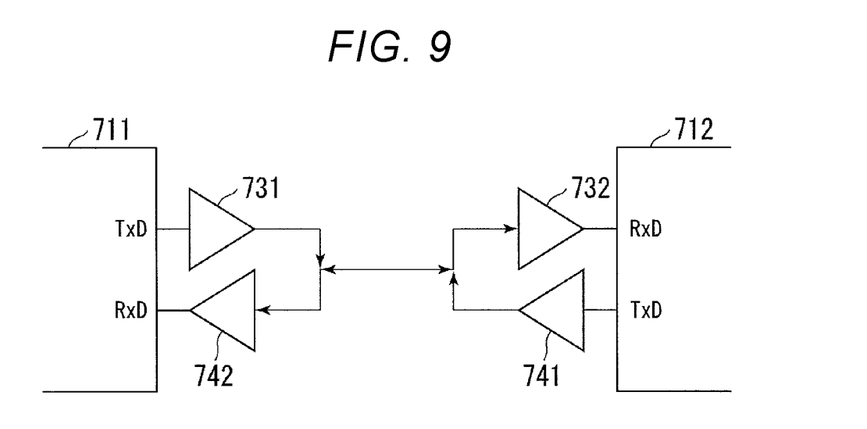
FIG. 9 shows a principle of half-duplex communication according to the embodiment.

FIG. 9 shows the principle of half-duplex communication according to the embodiment.

FIG. 9 shows a configuration example of half-duplex communication between a computer 711 and a computer 712.

The computer 711 has a TxD terminal as a terminal for transmitting a data signal and an RxD terminal as a terminal for receiving a data signal.

Similarly, the computer 712 has a TxD terminal as a terminal for transmitting a data signal and an RxD terminal as a terminal for receiving a data signal.

Part of a path connecting the TxD terminal of the computer 711 and the RxD terminal of the computer 712 and a path connecting the TxD terminal of the computer 712 and the RxD terminal of the computer 711 is formed using a common signal line. Note that, in the example of FIG. 9, amplifiers 731, 732, 741, 742 that amplify the data signals transmitted in these paths are shown.

In the configuration of half-duplex communication, when the communication of the data signal from one computer 711 to the other computer 712 is performed, the communication of the data signal from the other computer 712 to one computer 711 is disabled. Similarly, when the communication of the data signal from the other computer 712 to one computer 711 is performed, the communication of the data signal from one computer 711 to the other computer 712 is disabled.

Accordingly, in the configuration of half-duplex communication, in order to prevent collision between the communication from one computer 711 to the other computer 712 and the communication from the other computer 712 to one computer 711, for example, control to shift the times of these communications is performed.

As described above, in the half-duplex communication, one set of communication paths are used and the communication paths are bidirectionally used, and thereby, bidirectional communication is realized.

Configuration of Half-Duplex Communication

Figure 10:
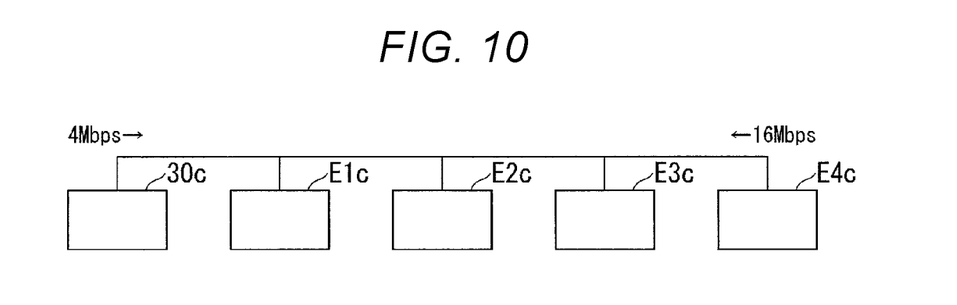
FIG. 10 shows a schematic configuration of half-duplex communication according to the embodiment.

FIG. 10 shows the schematic configuration of half-duplex communication according to the embodiment.

FIG. 10 shows an example of the configuration of half-duplex communication when the communication shown in FIG. 3 is performed.

FIG. 10 shows the micom 30c of the robot control apparatus 30 and the micoms E1c to E4c of the respective encoders E1 to E4. The signal line 311 and the signal line 312 shown in FIG. 3 are commonalized, and further commonalized with respect to each of the four micoms E1c to E4c.

Note that, in the example of FIG. 10, illustration of the signal line 313 of the GND terminal is omitted. The signal line 313 is commonalized with respect to the four micoms E1c to E4c.

Specifically, regarding the communication of data signals from the micom 30c of the robot control apparatus 30 to the micoms E1c to E4c of the encoders E1 to E4 and the communication of the data signals from the micoms E1c to E4c of the encoders E1 to E4 to the micom 30c of the robot control apparatus 30, the respective micoms E1c to E4c are connected to the common signal line connected to the micom 30c in a parallel position relationship.

For example, broadcast signals can be transmitted from the micom 30c to all of the micoms E1c to E4c. Further, for example, response signals can be transmitted from the respective micoms E1c to E4c to the micom 30c at different times.

In the half-duplex communication, the communication of the data signals from the robot control apparatus 30 to the encoders E1 to E4 and the communication of the data signals from the encoders E1 to E4 to the robot control apparatus 30 are performed at different times.

In this example, the communication of the data signals from the robot control apparatus 30 to the encoders E1 to E4 is normal UART communication, and the communication of the data signals from the encoders E1 to E4 to the robot control apparatus 30 is UART communication using the SDO terminals for SPI.

For example, a scheme of returning high-speed communication responses by the respective encoders E1 to E4 to a broadcast low-speed communication command from the robot control apparatus 30 may be realized.

Time Chart

Figure 11:
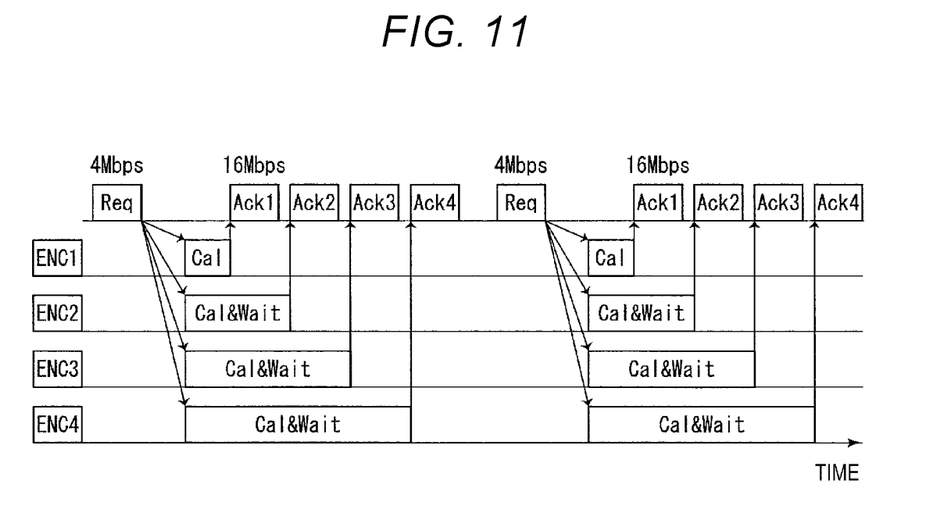
FIG. 11 shows a time chart showing communication according to the embodiment.

FIG. 11 shows the time chart showing communication according to the embodiment.

In the example of FIG. 11, a case of half-duplex communication is shown.

In FIG. 11, ECN1 to ECN4 show the encoder E1 to encoder E4, respectively. Req shows a request signal for requesting a response. Cal shows that predetermined calculation processing is performed. Cal & Wait shows that wait processing is performed after the predetermined calculation. Ack1 to Ack4 show acknowledgments from the encoder E1 to encoder E4, respectively. Note that "Wait" shows that wait processing is performed.

The robot control apparatus 30 transmits request signals to all encoders E1 to E4 by broadcasting. The speed of the communication is 4 Mbps.

The first encoder E1 receives the request signal, and then, performs the predetermined calculation processing and transmits a response signal to the robot control apparatus 30. In the example of FIG. 11, a case where the response is Ack is shown. The speed of the communication is 16 Mbps.

The second and subsequent encoders E2 to E4 receive the request signals, and then, perform the predetermined calculation processing and predetermined wait processing and transmit response signals to the robot control apparatus 30. In the example of FIG. 11, a case where the responses are Ack is shown.

Here, in the embodiment, different times for wait processing are set for the respective second and subsequent encoders E2 to E4. The lengths of the times for wait processing are the second encoder E2, the third encoder E3, and the fourth encoder E4 in the ascending order.

Thereby, the four encoders E1 to E4 transmit the response signals to the robot control apparatus 30 using the common signal line at different times.

For example, the robot control apparatus 30 transmits the request signals to the encoders E1 to E4 at predetermined time intervals.

Note that, in the example of FIG. 11, the robot control apparatus 30 transmits the request signals to all encoders E1 to E4 by broadcasting, however, when real time communication is unnecessary or when the speed of communication is not necessarily higher, transmission and reception may be performed with respect to each of the encoders E1 to E4, not by broadcasting. For example, when the robot control apparatus 30 transmits the request signal to the first encoder E1, the first encoder E1 performs the predetermined calculation processing and transmits the response signal to the robot control apparatus 30. Then, when the robot control apparatus 30 transmits the request signal to the second encoder E2, the second encoder E2 performs the predetermined calculation processing and transmits the response signal to the robot control apparatus 30.

When the configuration of full-duplex communication is used, the robot control apparatus 30 may simultaneously perform transmission and reception and, for example, sequentially perform transmission and reception with the encoders E1 to E4, not broadcasting. For example, the robot control apparatus 30 transmits the request signal to the second encoder E2 after transmitting the request signal to the first encoder E1 and before receiving the response signal from the first encoder E1. Then, the first encoder E1 and the second encoder E2 respectively perform the predetermined calculation processing from the times when receiving the request signals, and respectively transmit the response signals to the robot control apparatus 30. In this case, bias of wait times of the respective encoders E1 to E4 may be eliminated and the robot control apparatus 30 may perform communication more exactly in real time than that in the case of broadcasting.

Configuration of Branch

Figure 12:
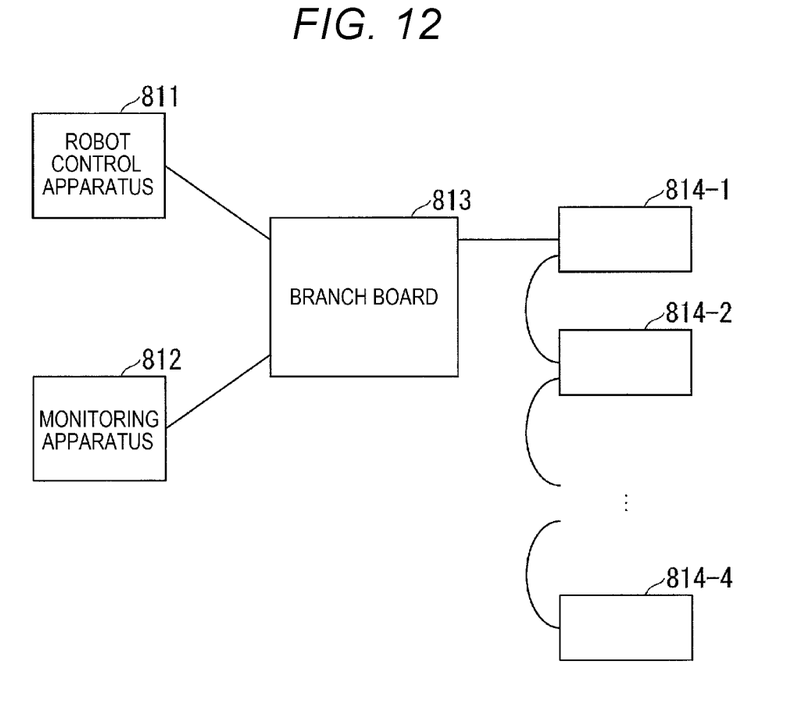
FIG. 12 shows a configuration of a branch according to the embodiment.

FIG. 12 shows the configuration of the branch according to the embodiment.

FIG. 12 shows a robot control apparatus 811, a monitoring apparatus 812, a branch board 813, and four encoders 814-1 to 814-4.

Here, the robot control apparatus 811 is an example of the robot control apparatus 30.

Further, the four encoders 814-1 to 814-4 are examples of the four encoders E1 to E4.

The monitoring apparatus 812 performs various kinds of monitoring on the robot 20. For example, the monitoring apparatus 812 performs monitoring for safety.

The branch board 813 is a board having a branch unit that branches signal paths.

Specifically, the robot control apparatus 811 is connected to the branch board 813 via a signal line.

Similarly, the monitoring apparatus 812 is connected to the branch board 813 via a signal line.

The one encoder 814-1 is connected to the branch board 813 via a signal line. The four encoders 814-1 to 814-4 are daisy-chain-connected in the order of the encoder 814-1, the encoder 814-2, the encoder 814-3, and the encoder 814-4.

Here, the daisy-chain connection is e.g. connection to bead a plurality of devices.

In the above described configuration, for example, the state in which the robot control apparatus 811 and the encoder 814-1 are connected and the state in which the robot control apparatus 811 and the encoder 814-1 are not connected may be switched by the branch board 813. Further, for example, the state in which the monitoring apparatus 812 and the encoder 814-1 are connected and the state in which the monitoring apparatus 812 and the encoder 814-1 are not connected may be switched by the branch board 813.

Note that the configuration for branching the wiring is not necessarily the configuration using the branch board 813, but e.g. a configuration for branching by the wiring itself may be used.

As described above, various forms may be used for the form of connection between the robot control apparatus 811 and the plurality of encoders 814-1 to 814-4.

Examples of Other Devices Than Encoders

As above, the case where the encoders are used as the devices on the other ends of the communication with the robot control apparatus 30 is explained, however, the devices may be other various devices than the encoders. The devices may be e.g. devices called peripheral devices of the robot.

As an example, various sensors may be used as the devices on the other ends of the communication with the robot control apparatus 30. The sensor is e.g. a force sensor, optical sensor, or a temperature sensor. Or, as the sensor, an image sensor that detects an image may be used. Note that the image sensor may be called a camera. The sensor may be e.g. a sensor provided in the robot 20 itself or a sensor provided around the robot 20 in a room in which the robot 20 is used or the like.

In this case, the micom of the robot control apparatus 30 and the micom of the sensor perform communication. For example, a request signal is transmitted from the micom of the robot control apparatus 30 to the micom of the sensor, and, in response, information detected in the sensor is transmitted as a response from the micom of the sensor to the micom of the robot control apparatus 30. The information detected in the sensor may be e.g. a detected value.

As another example, an I/O device that inputs and outputs signals in the robot 20 may be used as the device on the other end of the communication with the robot control apparatus 30. Various I/O devices may be used and, e.g. an I/O device that outputs a signal for turning on and off a switch, lamp, or the like, an I/O device that outputs a signal for moving a motor or the like, or an I/O device that outputs signals for various kinds of control, etc. may be used.

In this case, the micom of the robot control apparatus 30 and the micom of the I/O device perform communication. For example, a request signal is transmitted from the micom of the robot control apparatus 30 to the micom of the I/O device, and, in response, information input or output in the I/O device is transmitted as a response from the micom of the I/O device to the micom of the robot control apparatus 30.

Note that the devices on the other ends of the communication with the robot control apparatus 30 may be a plurality of the same type of devices or a plurality of devices including two or more different types of devices.

As specific examples, the devices on the other ends of the communication with the robot control apparatus 30 may be a plurality of encoders, a plurality of sensors, or a plurality of I/O devices.

Further, as a specific example, the devices on the other ends of the communication with the robot control apparatus 30 may be a plurality of devices including two types or three types of devices of encoders, sensors, and I/O devices.

Application of Communication Between Robot Control Apparatus and Devices

As above, the case where the UART communication or the asynchronous communication using the SDO terminals for SPI is applied to the communication from the robot control apparatus 30 to the devices including the encoders E1 to E4 and the asynchronous communication using the SDO terminals for SPI is applied to the communication from the devices including the encoders E1 to E4 to the robot control apparatus 30 is shown, however, the application of communication may be reversed.

As a specific example, a configuration in which the configurations and the operations of the micoms shown in FIG. 3 or 6 are reversed between the micoms of the robot control apparatus 30 and the micoms of the devices including the encoders E1 to E4 may be used.

Number of Devices on Other Ends of Communication With Robot Control Apparatus

As above, the case where the devices on the other ends of communication with the robot control apparatus 30 are the plurality of devices is explained, however, only one device may be on the other end of communication with the robot control apparatus 30.

Regarding Embodiments

As described above, in the robot 20 according to the embodiment, for example, transmission is performed by clock synchronization serial communication from the devices including the encoders E1 to E4 to the robot control apparatus 30. In the embodiment, the clock synchronization serial communication is asynchronous communication using SPI. Thereby, high-speed UART communication at 16 Mbps or the like may be realized using the micom having the SPI function. The micom having the SPI function is generally inexpensive.

In the robot 20 according to the embodiment, for example, communication may be realized unless a special element or special function is added to the micom at the reception side of the clock synchronization serial communication. It is only necessary that a communication speed and a protocol of a data signal are set in the micom.

In the robot 20 according to the embodiment, for example, the number of wires may be reduced and the number of elements of the circuit may be reduced.

In the robot 20 according to the embodiment, for example, the higher communication speed may be secured with the reduced number of wires.

The wire-saving with the smaller number of wires may realize reduction in size or cost of the robot 20 and is particularly effective for small robots.

The real-time communication may be secured by the higher communication speed and is effective for e.g. real-time work.

In the robot 20 according to the embodiment, even when the communication volume from the devices including the encoders E1 to E4 to the robot control apparatus 30, the higher communication speed is secured, and thereby, for example, the time taken for single transmission and reception may be shortened and the responsiveness may be improved.

In the robot 20 according to the embodiment, for example, the transmission is performed by the communication system without the clock line from the robot control apparatus 30 to the devices including the encoders E1 to E4. In the embodiment, the asynchronous serial communication is used as the communication system without the clock line. Note that, as the communication system without the clock line, e.g. asynchronous communication using SPI may be used or clock-embedded system may be used.

In the robot 20 according to the embodiment, the speed of the communication from the robot control apparatus 30 to the devices including the encoders E1 to E4 is set to be lower and the speed of the communication from the devices including the encoders E1 to E4 to the robot control apparatus 30 is set to be higher according to the configuration in which the communication volume of data from the robot control apparatus 30 to the devices including the encoders E1 to E4 is lower and the communication volume of data from the devices including the encoders E1 to E4 to the robot control apparatus 30 is higher. That is, in the robot 20 according to the embodiment, a difference in communication speed is provided between the upstream and the downstream, and thereby, the entire configuration is streamlined.

Robot System

In the above description, the robot 20 containing the robot control apparatus 30 is explained in the example of FIG. 1, however, as another configuration example, a robot system in which a robot and a robot control apparatus are separately provided may be implemented.

Figure 13:
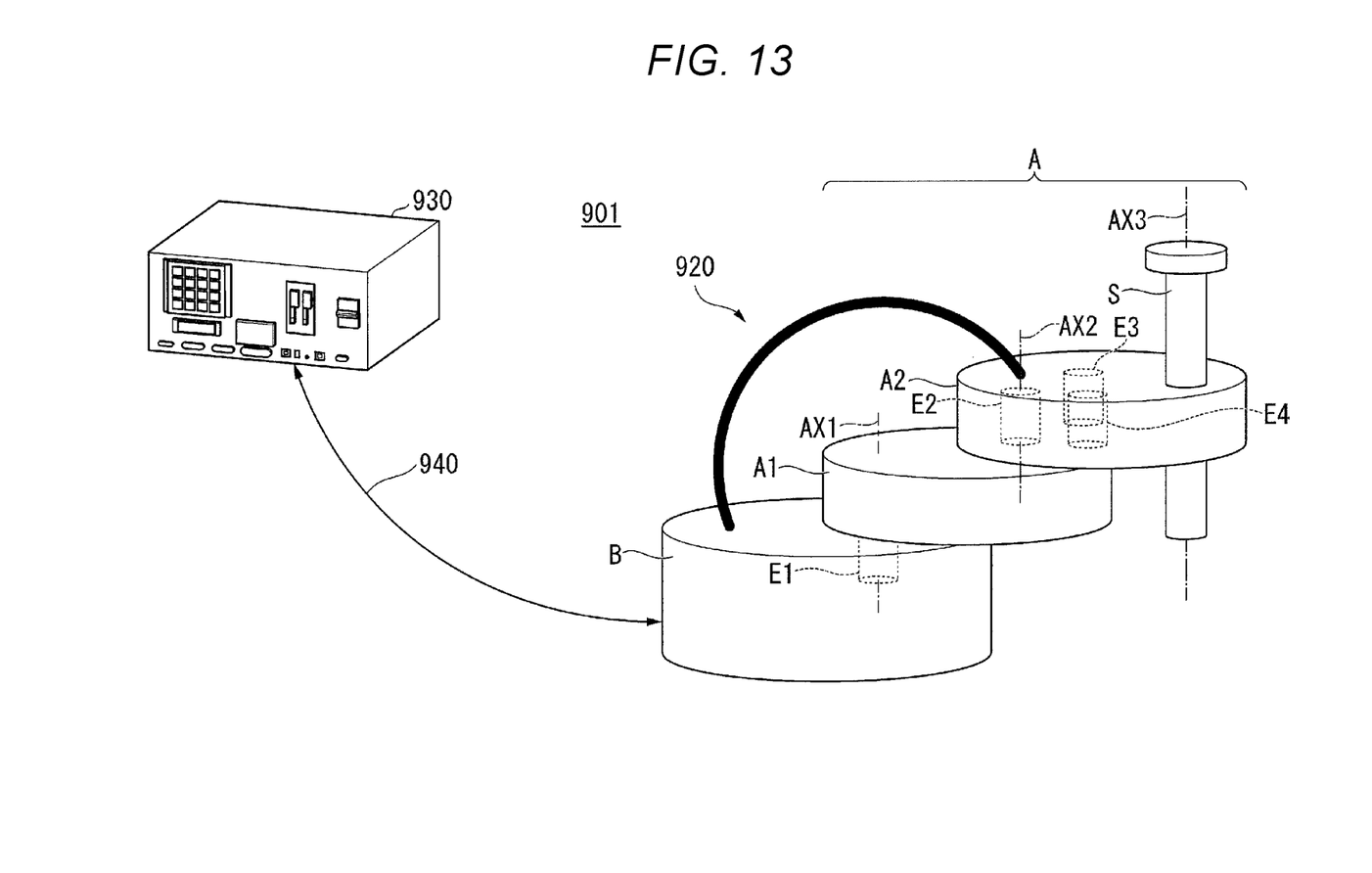
FIG. 13 shows a schematic configuration of a robot system according to the embodiment.

FIG. 13 shows the schematic configuration of the robot system 901 according to the embodiment.

The robot system 901 includes a robot 920, a robot control apparatus 930, and a cable 940 connecting the robot 920 and the robot control apparatus 930.

In the example of FIG. 13, for convenience of explanation, the respective parts forming the robot 920 have the same signs as those shown in FIG. 1.

In the robot system 901, for example, the robot 920 and the robot control apparatus 930 perform the same operation as the robot 20 and the robot control apparatus 30 shown in FIG. 1 except that the robot and the apparatus are separately provided.

Note that, for example, when an end effector is attached to a robot, the robot system 901 may include the end effector.

Configuration Examples

As a configuration example, the robot control apparatus 30 is provided in the robot 20. Further, first connection of connecting the robot control apparatus 30 and a first device by a signal line using a transmission terminal of the clock synchronization serial communication system is made, and first communication in which an asynchronous signal is transmitted from the transmission terminal is performed.

Therefore, in the robot 20, in the communication between the robot control apparatus 30 and the first device, the higher communication speed may be secured with the reduced number of wires.

Note that, in the example of FIG. 1, an example of the first device is the encoders E1 to E4.

In the examples of FIG. 3 and FIG. 6, an example of the transmission terminal of the clock synchronization serial communication system is the SDO terminal for SPI.

In the example of FIG. 5, an example of the asynchronous signal is a signal having the signal wave 1011.

As a configuration example, in the robot 20, the first connection is made and the first communication is performed in one of the communication from the robot control apparatus 30 to the first device and the communication from the first device to the robot control apparatus 30, and second connection without the clock line is made in the other.

Therefore, in the robot 20, in the communication between the robot control apparatus 30 and the first communication, the number of wires may be further reduced.

Note that, in the example of FIG. 3, an example of the connection without the clock line is UART communication.

As a configuration example, in the robot 20, the first connection is made and the first communication is performed in the communication from the first device to the robot control apparatus 30, and second connection is made in the connection from the robot control apparatus 30 to the first device.

Therefore, in the robot 20, the higher communication speed may be secured with respect to the communication from the first device to the robot control apparatus 30.

As a configuration example, in the robot 20, the robot control apparatus 30 and a plurality of first devices are connected by a bus line.

Therefore, in the robot 20, when the robot control apparatus 30 and the plurality of first devices are connected by the bus line, in the communication between the robot control apparatus 30 and the first devices, the higher communication speed may be secured with the reduced number of wires.

As a configuration example, in the robot 20, the first device includes an encoder.

Therefore, in the robot 20, in the communication between the robot control apparatus 30 and the encoder, the higher communication speed may be secured with the reduced number of wires.

As a configuration example, in the robot 20, the first device includes one or both of a sensor and an I/O device.

Therefore, in the robot 20, in the communication between the robot control apparatus 30 and the sensor or I/O device, the higher communication speed may be secured with the reduced number of wires.

As a configuration example, in the robot system 901 including the robot 920 and the robot control apparatus 930 controlling the robot 920, first connection of connecting the robot control apparatus 930 and the first device by the signal line using the transmission terminal of the clock synchronization serial communication system is made, and first communication in which the asynchronous signal is transmitted from the transmission terminal is performed.

Therefore, in the robot system 901, in the communication between the robot control apparatus 30 and the first device, the higher communication speed may be secured with the reduced number of wires.

As a configuration example, regarding the robot control apparatus 30, 811, 930 controlling the robot, first connection of connecting the robot control apparatus 30, 811, 930 and the first device by the signal line using the transmission terminal of the clock synchronization serial communication system is made, and first communication in which the asynchronous signal is transmitted from the transmission terminal is performed.

Therefore, in the robot control apparatus 30, 811, 930, in the communication between the robot control apparatus 30, 811, 930 and the first device, the higher communication speed may be secured with the reduced number of wires.

Note that programs for realization of functions of arbitrary configuration units in arbitrary devices such as the above described robot control apparatuses 30, 811, 930 or encoders E1 to E4, 814-1 to 814-4, etc. may be recorded in a computer-readable recording medium and the programs may be read and executed by a computer system. Here, "computer system" includes an operating system (OS) or hardware including peripheral devices. Further, "computer-readable recording medium" refers to a memory device including a portable medium such as a flexible disc, magnetooptical disc, ROM, or CD (Compact Disc)-ROM (Read Only Memory) and a hard disc provided inside of the computer system. Furthermore, "computer-readable recording medium" includes a medium that holds programs in a fixed time like a volatile memory (RAM: Random Access Memory) within a computer system serving as a server or client when the programs are transmitted via a network such as the Internet or a communication line such as a phone line.

The programs may be transmitted from a computer system storing the programs in a memory device or the like via a transmission medium or by transmission wave in the transmission medium to another computer. Here, "transmission medium" that transmits the programs refers to a medium having a function of transmitting information like a network such as the Internet or a communication line such as a phone line.

The programs may be for realization of part of the above described functions. Further, the programs may realize the above described functions by combinations with programs previously recorded in a computer system, the so-called differential files. The differential files may be called differential programs.

As above, the embodiments of the present disclosure are described in detail with reference to the drawings, and the specific configurations are not limited to the embodiments, but include design etc. without departing from the scope of the present disclosure.

What is claimed is:

1. A robot comprising a robot control apparatus that communicates with a device, wherein
a transmission terminal of a clock synchronization serial communication system of the device and a reception terminal of a clock asynchronization serial communication system of the robot control apparatus are connected by a signal line, and
the robot control apparatus receives an asynchronous signal from the transmission terminal of the device by the reception terminal of the robot control apparatus on the signal line.

2. The robot according to claim 1, wherein
the robot control apparatus transmits a signal of an asynchronous serial communication system to the device.

3. The robot according to claim 1, wherein
the robot control apparatus and a plurality of the devices are connected by a bus line.

4. The robot according to claim 1, wherein
the device is an encoder.

5. The robot according to claim 1, wherein
the device is a sensor or I/O device.

6. A robot comprising a robot control apparatus that communicates with a device, wherein
a transmission terminal of a clock synchronization serial communication system of the robot control apparatus and a reception terminal of a clock synchronization serial communication system of the device are connected by a signal line, and
the robot control apparatus transmits an asynchronous signal to the reception terminal of the device from the transmission terminal of the robot control apparatus on the signal line.

7. A robot system comprising:
a robot; and
a robot control apparatus that communicates with a device and controls the robot, wherein
a transmission terminal of a clock synchronization serial communication system of the device and a reception terminal of a clock asynchronization serial communication system of the robot control apparatus are connected by a signal line, and
the robot control apparatus receives an asynchronous signal from the transmission terminal of the device by the reception terminal of the robot control apparatus on the signal line.

8. A robot control apparatus that communicates with a device, comprising a reception terminal of a clock asynchronization serial communication system connected to a transmission terminal of a clock synchronization serial communication system of the device by a signal line, and receiving an asynchronous signal from the transmission terminal of the device by the reception terminal of the robot control apparatus on the signal line.

* * * * *